US010992829B2

(12) United States Patent
Minamino

(10) Patent No.: US 10,992,829 B2
(45) Date of Patent: Apr. 27, 2021

(54) IMAGE FORMING APPARATUS PERFORMING PROCESSING FOR RESOLVING USER'S COMPLAINT AGAINST TO PRINTED RESULT

(71) Applicant: KYOCERA Document Solutions Inc., Osaka (JP)

(72) Inventor: Koji Minamino, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/695,524

(22) Filed: Nov. 26, 2019

(65) Prior Publication Data
US 2020/0177748 A1 Jun. 4, 2020

(30) Foreign Application Priority Data

Nov. 30, 2018 (JP) .............................. JP2018-225209

(51) Int. Cl.
*G06F 3/12* (2006.01)
*H04N 1/00* (2006.01)
(Continued)

(52) U.S. Cl.
CPC ....... *H04N 1/00403* (2013.01); *G06F 3/1204* (2013.01); *G06F 3/1254* (2013.01); *G10L 15/08* (2013.01); *G10L 15/22* (2013.01); *H04N 1/00037* (2013.01); *H04N 1/00087* (2013.01); *H04N 1/00395* (2013.01); *G06F 3/1234* (2013.01); *G06F 3/16* (2013.01);
(Continued)

(58) Field of Classification Search
None
See application file for complete search history.

(56) References Cited

U.S. PATENT DOCUMENTS

2010/0309510 A1* 12/2010 Hansen ................. G06F 3/1288
358/1.15
2013/0300056 A1* 11/2013 Kai ........................ B65H 5/062
271/262
2016/0112602 A1* 4/2016 Kawai ..................... H04N 1/46
358/1.14

FOREIGN PATENT DOCUMENTS

JP 2017-102522 A 6/2017

OTHER PUBLICATIONS

Machine Translation in English of JP 2017-102522 to Yuzuru Uchida.*

* cited by examiner

*Primary Examiner* — Haris Sabah
(74) *Attorney, Agent, or Firm* — IP Business Solutions, LLC

(57) ABSTRACT

An image forming apparatus includes: an image forming device; a recording paper conveyance device discharging, to an outside of the image forming apparatus, a print result obtained by forming an image on a recording paper by the image forming device; a microphone; and a control device functioning as a controller that controls the image forming device and the recording paper conveyance device in accordance with a print condition and as a voice recognition device that recognizes voice collected by the microphone during a predefined detection period starting after the print result is discharged to the outside of the image forming apparatus and detects, from the recognized voice, a word indicating a predefined complaint against appearance of the print result. Upon detecting the word indicating the predefined complaint by the voice recognition device, the controller performs predefined processing as processing of resolving a cause of the complaint indicated by the word.

6 Claims, 7 Drawing Sheets

(51) Int. Cl.
  *G10L 15/08* (2006.01)
  *G10L 15/22* (2006.01)
  *G06F 3/16* (2006.01)
  *G06K 15/00* (2006.01)
(52) U.S. Cl.
  CPC .... *G06K 15/4085* (2013.01); *G10L 2015/088* (2013.01); *G10L 2015/223* (2013.01)

Fig.4

| | PROCESSING (EXAMPLE 1) | PROCESSING (EXAMPLE 2) |
|---|---|---|
| LIGHT | ADJUST TO SIDE WHERE PRINT DENSITY INCREASES | PROMPT USER TO ADJUST PRINT DENSITY |
| DARK | ADJUST TO SIDE WHERE PRINT DENSITY DECREASES | PROMPT USER TO ADJUST PRINT DENSITY |
| SHIFTED | ADJUST PRINT POSITION | PROMPT USER TO ADJUST PRINT POSITION |
| BLURRED | EXECUTE CALIBRATION PROCESSING | PROMPT USER TO EXECUTE INSTRUCTION FOR CALIBRATION PROCESSING |

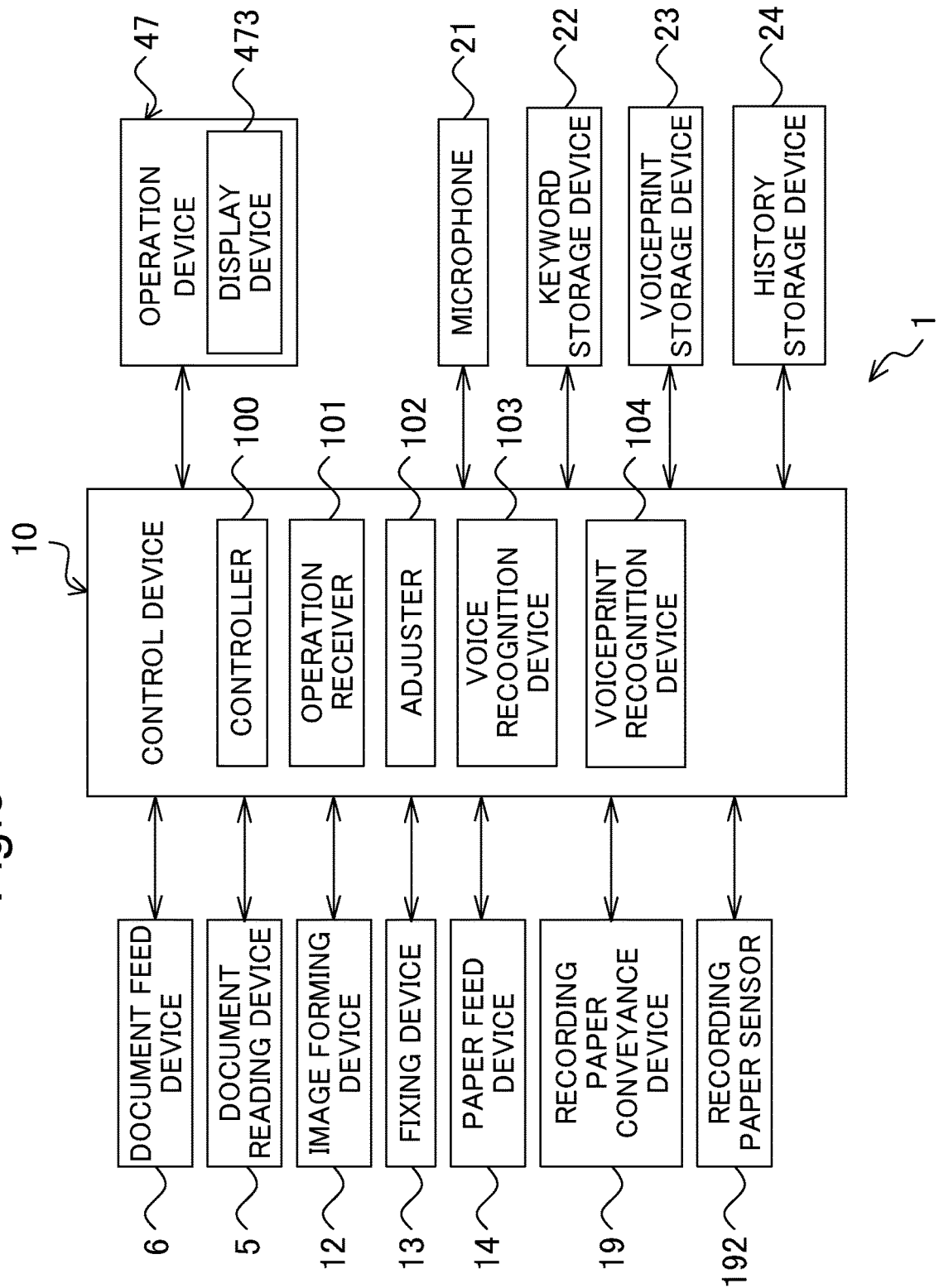

Fig.7A

| | PROCESSING |
|---|---|
| LIGHT | ADJUST TO SIDE WHERE PRINT DENSITY INCREASES |
| DARK | ADJUST TO SIDE WHERE PRINT DENSITY DECREASES |
| SHIFTED | ADJUST PRINT POSITION |
| BLURRED | EXECUTE CALIBRATION PROCESSING |

Fig.7B

| | PROCESSING (WHEN FREQUENCY IS LOWER THAN THRESHOLD VALUE) | PROCESSING (WHEN FREQUENCY IS EQUAL TO OR GREATER THAN THRESHOLD VALUE) |
|---|---|---|
| LIGHT | ADJUST TO SIDE WHERE PRINT DENSITY INCREASES BY ONE LEVEL | ADJUST TO SIDE WHERE PRINT DENSITY INCREASES BY TWO LEVELS |
| DARK | ADJUST TO SIDE WHERE PRINT DENSITY DECREASES BY ONE LEVEL | ADJUST TO SIDE WHERE PRINT DENSITY DECREASES BY TWO LEVELS |

IMAGE FORMING APPARATUS PERFORMING PROCESSING FOR RESOLVING USER'S COMPLAINT AGAINST TO PRINTED RESULT

INCORPORATION BY REFERENCE

This application claims priority to Japanese Patent Application No. 2018-225209 filed on Nov. 30, 2018, the entire contents of which are incorporated by reference herein.

BACKGROUND

This disclosure relates to an image forming apparatus including a voice recognition function.

Electronic devices are known which include a voice recognition function and execute an instruction indicated by recognized voice. For example, there is a technology by which, upon detecting voice indicating operation failure, such as "Oops, made a mistake", during a predefined period starting upon start of key operation, a state of an electronic device is returned to a state before reception of the key operation.

SUMMARY

A technology obtained by further improving the technology described above will be described as one aspect of this disclosure.

An image forming apparatus according to one aspect of this disclosure includes an image forming device, a recording paper conveyance device, a microphone, and a control device. The image forming device forms an image on recording paper. The recording paper conveyance device conveys the recording paper to the image forming device and discharges, to an outside of the image forming apparatus, a print result obtained by forming the image on the recording paper by the image forming device. The control device includes a processor and, as a result of executing a control program by the processor, functions as a controller and a voice recognition device. The controller controls the image forming device and the recording paper conveyance device in accordance with a print condition. The voice recognition device recognizes voice collected by the microphone during a predefined detection period starting upon the discharge of the print result to the outside of the image forming apparatus and detects, from the recognized voice, a word indicating a predefined complaint against appearance of the print result. Upon detecting the word indicating the predefined complaint by the voice recognition device, the controller performs predefined processing as processing of resolving a cause of the complaint indicated by the word.

BRIEF DESCRIPTION OF THE DRAWINGS

FIG. 4 is a diagram illustrating one example of processing performed for resolving causes of complaints against a print result.

FIG. 5 is a functional block diagram schematically illustrating main inner configuration of an image forming apparatus according to a second embodiment.

FIGS. 7A and 7B are diagrams each illustrating one example of the processing for resolving the causes of the complaints against the print result.

DETAILED DESCRIPTION

Figure 1:
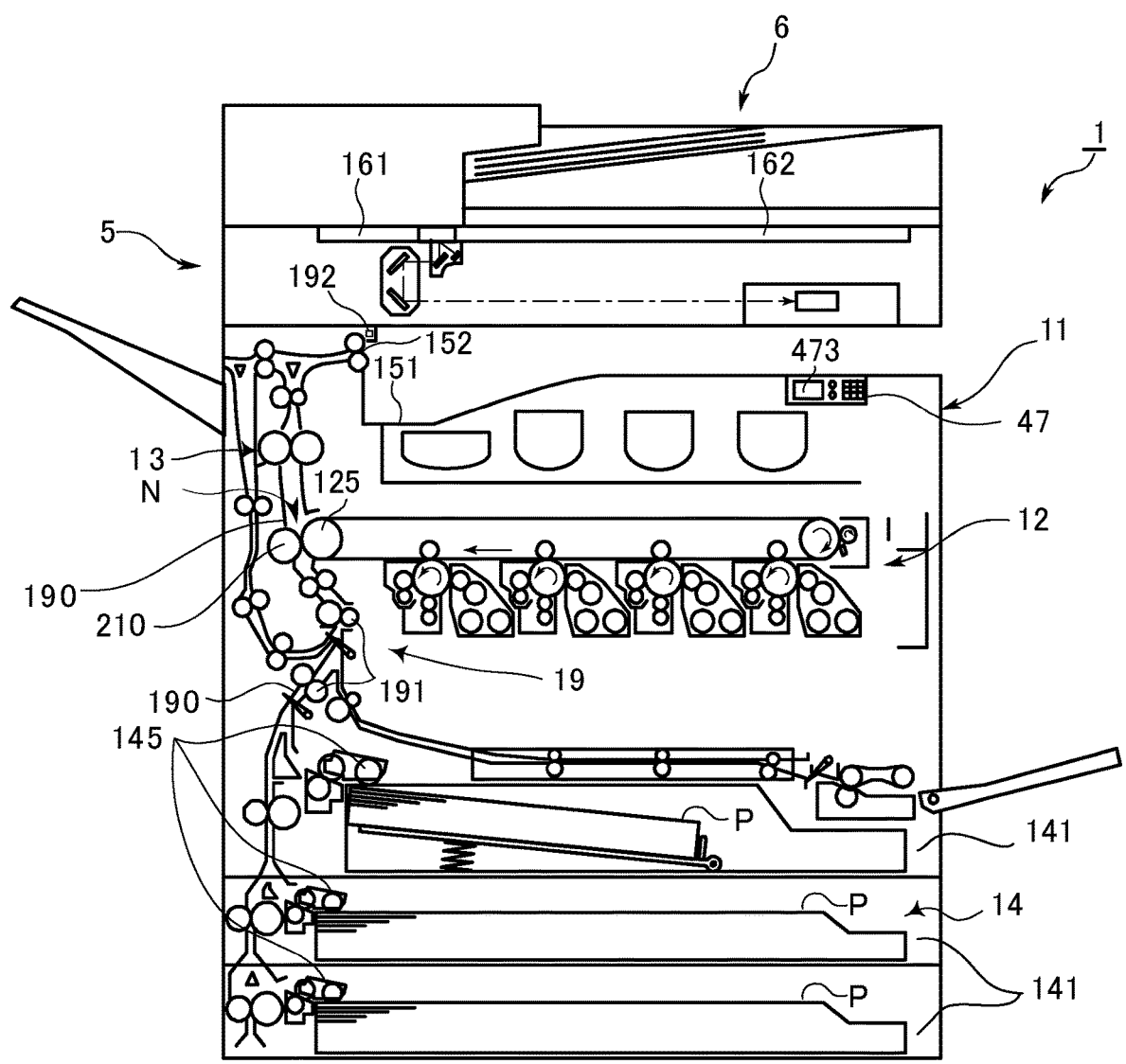
FIG. 1 is a partial cross-sectional front view schematically illustrating a structure of an image forming apparatus according to a first embodiment of this disclosure.

Hereinafter, an image forming apparatus according to one embodiment of this disclosure will be described with reference to the drawings. FIG. 1 is a partial cross-sectional front view schematically illustrating a structure of an image forming apparatus according to a first embodiment of this disclosure. An image forming apparatus 1 is, for example, a multifunction peripheral combining together a plurality of functions such as a copy function, a print function, a scan function, and a facsimile function. The image forming apparatus 1 includes, in an apparatus body 11, an operation device 47, a document feed device 6, a document reading device 5, an image forming device 12, a fixing device 13, a paper feed device 14, and a recording paper conveyance device 19.

The operation device 47 receives, from an operator, instructions, such as an image formation operation execution command, for various types of operation and processing executable by the image forming apparatus 1. The operation device 47 includes a display device 473 which displays, for example, an operation guide to an operator. The display device 473 is a touch panel, and the operator can touch a button or a key displayed on a screen to operate the image forming apparatus 1.

A case where document reading operation is performed in the image forming apparatus 1 will be described. The document reading device 5 optically reads an image of a document conveyed by the document feed device 6 and passing through conveyed-reading platen glass 161 or a document loaded on loaded-reading platen glass 162 to generate image data. The image data generated by the document reading device 5 is saved into, for example, a built-in hard disk drive (HDD) or a network-connected computer.

The document reading device 5 has a light source, a reflection mirror, etc. The document reading device 5 uses the light source to irradiate the document and receives light reflected therefrom by a charge coupled device (CCD) sensor, thereby reading the image from the document.

A case where the image formation operation is performed in the image forming apparatus 1 will be described. Based on the image data generated through the document reading operation, image data stored in the built-in HDD, image data received from the network-connected computer, etc., the image forming device 12 forms a toner image on recording paper P fed from the paper feed device 14 and conveyed by the recording paper conveyance device 19.

The recording paper conveyance device 19 includes: a conveyance path 190 which conveys the recording paper P from the paper feed device 14 towards a discharge tray 151; and a conveyance roller pair 191 which is provided at an appropriate place of the conveyance path 190. The recording paper conveyance device 19 causes the recording paper P fed from the paper feed device 14 to be conveyed inside of the conveyance path 190 by the conveyance roller pair 191.

At a nip part N formed between a secondary transfer roller 210 and a driving roller 125, the image forming device 12 forms an image on the recording paper P conveyed through the conveyance path 190 from the paper feed device 14.

The fixing device 13 fixes the toner image on the recording paper P through thermal compression. The recording paper P subjected to the fixing processing is consequently discharged onto the discharge tray 151 through a discharge port 152 by the recording paper conveyance device 19. That is, the recording paper conveyance device 19 discharges the recording paper P to an outside of the image forming apparatus 1.

The paper feed device 14 includes a plurality of paper feed cassettes 141 and a plurality of pickup rollers 145. The pickup rollers 145 are respectively provided above the paper feed cassettes 141. The recording paper P stored in the paper feed cassette 141 is sent out towards the conveyance path 190 by the pickup roller 145 and the recording paper P conveyed by the conveyance path 190 is conveyed towards the nip part N by the conveyance roller pair 191.

Figure 2:
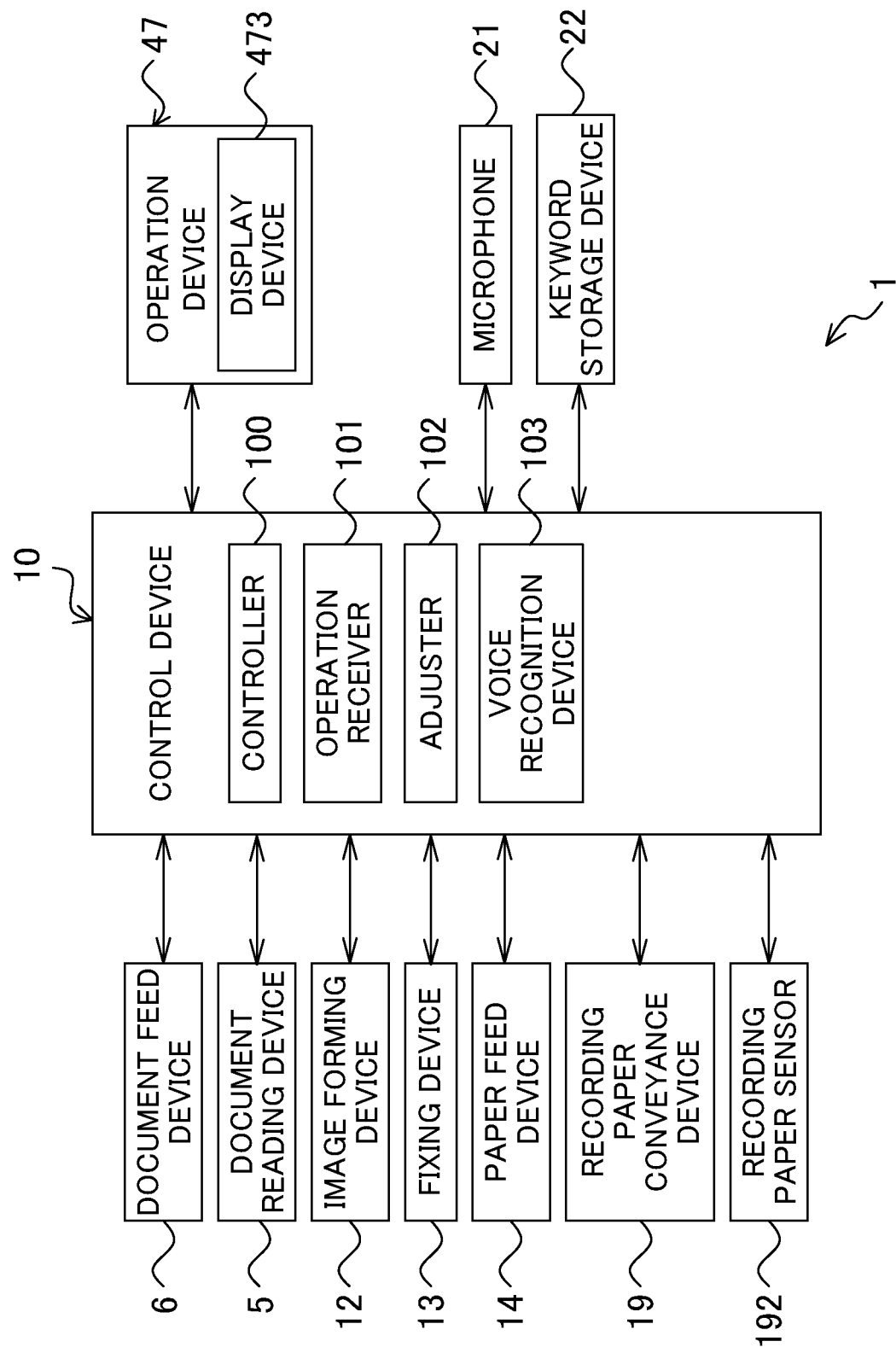
FIG. 2 is a functional block diagram schematically illustrating main inner configuration of the image forming apparatus according to the first embodiment.

FIG. 2 is a functional block diagram schematically illustrating main inner configuration of the image forming apparatus 1 according to the first embodiment. The image forming apparatus 1 includes a control device 10, the document feed device 6, the document reading device 5, the image forming device 12, the fixing device 13, the paper feed device 14, the recording paper conveyance device 19, a recording paper sensor 192, the operation device 47, a microphone 21, and a keyword storage device 22. Note that portions with the same configuration as those of the image forming apparatus 1 illustrated in FIG. 1 will be provided with the same numerals and their detailed description will be omitted here.

The recording paper sensor 192 is arranged near the discharge port 152 illustrated in FIG. 1 for the purpose of detecting the discharge of the recording paper P onto the discharge tray 151. The recording paper sensor 192 is formed of a known reflective photoelectric sensor including a light-emitting element and a light-receiving element which detects light reflected from the recording paper P after emitted from the light-emitting element. The recording paper sensor 192 detects a leading edge and a trailing edge of the recording paper P.

The microphone 21 is a device which collects voice from a user.

The keyword storage device 22 is formed of a storage device such as, for example, a flash memory. Predefined words indicating predefined complaints against a print result are registered as keywords in the keyword storage device 22. For example, registered as the keywords into the keyword storage device 22 are: words such as "light" and "dark" indicating complaints against print density; words such as "shifted" indicating complaints against print position; and words such as "blurred" indicating complaints against hue.

The control device 10 includes: a processor, a random access memory (RAM), a read only memory (ROM), and a dedicated hardware circuit. The processor is, for example, a central processing unit (CPU), an application specific integrated circuit (ASIC), or a micro processing unit (MPU). The control device 10 includes: a controller 100, an operation receiver 101, an adjuster 102, and a voice recognition device 103.

The control device 10 functions as the controller 100, the operation receiver 101, the adjuster 102, or the voice recognition device 103 through operation performed by the processor in accordance with a control program stored in the ROM or an HDD, not illustrated. However, the controller 100, etc. may also be each formed by a hardware circuit without depending on the operation performed in accordance with the control program by the control device 10. Hereinafter, the same applies to each of the embodiments unless otherwise is specified.

The controller 100 is in charge of overall operation control of the image forming apparatus 1. The controller 100 is connected to the document feed device 6, the document reading device 5, the image forming device 12, the fixing device 13, the paper feed device 14, the recording paper conveyance device 19, the recording paper sensor 192, the operation device 47, the microphone 21, and the keyword storage device 22, and performs driving control of theses devices. For example, the controller 100 controls the image forming device 12, the recording paper conveyance device 19, etc. in accordance with a print conditions.

The operation receiver 101 receives operation input from a user via the operation device 47. For example, the operation receiver 101 receives user operation on a hard key included in the operation device 47 and further receives, through a touch panel function included in the display device 473, user operation performed on an operation screen displayed at the display device 473.

The adjuster 102 performs control for adjusting the print condition based on the user operation received by the operation receiver 101. Examples of the print condition include print density and print position (print range). Where a set value of standard predefined density is "0", the operation receiver 101 receives user change of the set value in a range of "−4 to +4" (the density increases with an increase in the numerical value), and the adjuster 102 performs processing of changing the print density as one of the print conditions based on the user operation received by the operation receiver 101. For example, the adjuster 102 changes a numerical value of a charging voltage of a charging device or developing bias of a developing device included in the image forming device 12 to thereby change the print density upon image formation on the recording paper P.

Moreover, where a set value of a reference position is "0", the operation receiver 101 receives user change of the set value in units of 1 mm in vertical and horizontal directions, and the adjuster 102 changes the print position as one of the print conditions based on the user operation received by the operation receiver 101. For example, when the user has specified upward shift at "1 mm" and rightward shift at "2 mm", the adjuster 102 makes adjustment in a manner such as to shift the print position upward by 1 mm and shift the print position rightward by 2 mm. For example, the adjuster 102 performs driving control of a registration roller which adjusts timing of conveying the recording paper P to the network N formed between the secondary transfer roller 210 and the driving roller 125 or the adjuster 102 changes timing of image transfer onto the recording paper P by the image forming device 12 to thereby change an image formation position (print position) on the recording paper P.

The voice recognition device 103 analyzes, by a known technique, a word indicated by voice collected by, for example, the microphone 21 during a predefined detection period T1 (for example, five seconds) starting upon discharge of the recording paper P as a print result onto the discharge tray 151 (an outside of the image forming apparatus 1), and based on this analyzed word, the voice recognition device 103 detects a word indicating a predefined complaint against the appearance of the print result.

Timing of discharging the recording paper P onto the discharge tray 151 is detected by the controller 100. Based on a result of the detection performed by the recording paper sensor 192, the controller 100 detects the timing of discharging the recording paper P onto the discharge tray 151. For example, upon switching of a detection signal of the recording paper sensor 192 from OFF to ON, the controller 100 determines that a leading edge of the recording paper P has passed through a detection position of the recording paper sensor 192, and then upon switching of the detection signal of the recording paper sensor 192 from ON to OFF, the controller 100 determines that a trailing edge of the recording paper P has passed through the detection position of the recording paper sensor 192, and determines that the recording paper P has been discharged onto the discharge tray 151 through the discharge port 152. Specifically, when the detection signal of the recording paper sensor 192 has switched from ON to OFF after the switching of the detection signal of the recording paper sensor 192 from OFF to ON is a time point at which the recording paper P has been discharged onto the discharge tray 151.

Upon detecting the word indicating the predefined complaint by the voice recognition device 103, the controller 100 performs predefined processing as processing of resolving a cause of the complaint indicated by the word. For example, upon detecting "light" as the word indicating the complaint against the print density by the voice recognition device 103, the controller 100 performs, as the predefined processing, adjustment processing of increasing the print density. The predefined processing described above, that is, each processing illustrated in FIG. 4 to be described later on is stored in the ROM in the control device 10 in association with the word indicating the complaint. Note that the predefined processing described above may be stored in the keyword storage device 22 or an HDD, not illustrated. Then the controller 100 causes the display device 473 to display a message prompting the user to perform reprinting.

Figure 3:
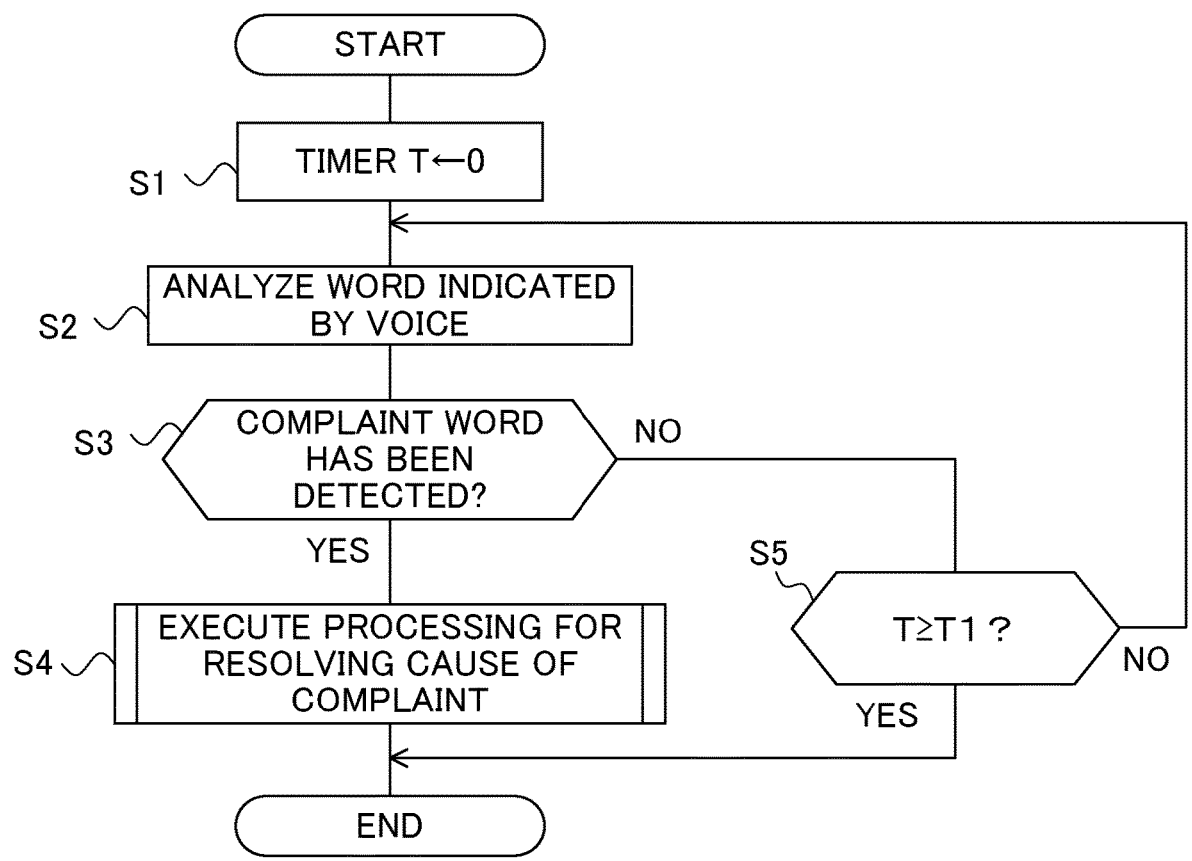
FIG. 3 is a flowchart illustrating one example of processing performed in a control device of the image forming apparatus according to the first embodiment.

Next, one example of the processing performed in the control device 10 of the image forming apparatus 1 according to the first embodiment will be described based on a flowchart illustrated in FIG. 3. Note that this processing is performed upon determining by the controller 100 that the recording paper P as a print result has been discharged onto the discharge tray 151.

First, the control device 10 is activated by resetting, at 0, a timer T for measuring time which has passed since the discharge of the recording paper P as a print result onto the discharge tray 151 (S1). The voice recognition device 103 analyzes the word indicated by the voice collected by the microphone 21 (S2), compares the analyzed word with the keyword stored in the keyword storage device 22, and based on the word indicated by the recognized voice, detects the word (for example, light, dark, shifted, blurred, etc.) indicating the predefined complaint against the appearance of the print result (S3).

The controller 100 judges whether or not the voice recognition device 103 has detected the word indicating the aforementioned complaint (S3), and upon judging that the voice recognition device 103 has detected the word indicating the aforementioned complaint (YES in S3), the controller 100 performs the predefined processing as the processing of resolving the cause of the complaint indicated by this word (S4). Then the processing ends. The processing of S4 will be described in detail later on.

On the other hand, upon judging that the voice recognition device 103 has not detected the word indicating the aforementioned complaint (NO in S3), the controller 100 judges whether or not the timer T has reached the detection period T1 (S5).

Upon judging that the timer T has reached the detection period T1 (YES in S5), the controller 100 ends this processing. On the other hand, upon judging by the controller 100 that the timer T has not reached the detection period T1 (NO in S5), the processing returns to S2.

Next, one example of processing performed by the controller 100 in S4 will be described with reference to FIG. 4. For example, when the word uttered by the user is "It is light" and the voice recognition device 103 has detected the word "light" as the word indicating the aforementioned complaint, the controller 100 specifies, in association with the word "light", print density adjustment which is stored as the predefined processing as the processing of resolving the causes of the complaint indicated by the word. In this case, the controller 100 changes the print density towards a side where the print density increases. Then the controller 100 causes the display device 473 to display a message prompting the user to perform reprinting (Example 1). For example, when the set value of the print density is "0", the controller 100 sets the set value at "+1". That is, the controller 100 adjusts the print condition in a direction resolving the cause of the complaint indicated by the word detected by the voice recognition device 103, and then performs processing of prompting the user to perform reprinting.

Moreover, for example, when the word uttered by the user is "It is dark" and the voice recognition device 103 has detected the word "dark", the controller 100 specifies, in association with the word "dark", print density adjustment which is stored as the predefined processing as the processing of resolving the cause of the complaint indicated by the word. In this case, the controller 100 changes the print density towards a side where the print density decreases. Then the controller 100 causes the display device 473 to display a message prompting the user to perform reprinting (Example 1). For example, when the set value of the print density is "0", the controller 100 sets the set value at "−1". That is, the controller 100 adjusts the print condition in a direction resolving the cause of the complaint indicated by the word detected by the voice recognition device 103 and then performs processing of prompting the user to perform reprinting.

Alternatively, when the voice recognition device 103 has detected the words "light" and "dark", the controller 100 may display, at the display device 473, an operation screen for receiving user change of the set value of the print density and may prompt the user to adjust the print density (Example 2). That is, the controller 100 prompts the user to adjust the print condition. Upon the adjustment of the print condition, the controller 100 performs the predefined processing under the changed print condition.

Moreover, for example, when the word uttered by the user is "It is shifted" and the voice recognition device 103 has detected the word "shifted", the controller 100 specifies, in association with the word "shifted", print position adjustment which is stored as the predefined processing as the processing of resolving the cause of the complaint indicated by the word. In this case, the controller 100, as the print position adjustment, changes the position of image formation on the recording paper P by a predefined distance in a predefined direction. Then the controller 100 causes the display device 473 to display a message prompting the user to perform reprinting (Example 1). Moreover, before performing the print position adjustment, the controller 100 may display, at the display device 473, an operation screen for receiving user change of the set value of the print position and may prompt the user to adjust the print position (Example 2). Upon the adjustment of the print condition, the controller 100 performs the predefined processing under the changed print condition.

Moreover, for example, when the word uttered by the user is "It is blurred" and the voice recognition device 103 has detected the word "blurred", the controller 100 specifies, in association with the word "blurred", calibration processing which is stored as the predefined processing as the processing of resolving the cause of the complaint indicated by the word, and executes the calibration processing (one example of predefined maintenance processing) (Example 1). The calibration processing includes, for example, either or all combinations of timing adjustment of superposing images of respective colors at time of color printing, hue adjustment, control of refresh operation of releasing an old toner, and development condition correction processing. Moreover, before performing the calibration processing, the controller 100 may display, at the display device 473, an operation screen for receiving an instruction for executing the calibration processing and may prompt the user to input the instruction for executing the calibration processing (Example 2). Upon receiving the instruction for executing the calibration processing, the controller 100 performs the calibration processing.

According to the first embodiment described above, upon detecting the word (for example, light, dark, shifted, or blurred) indicating the complaint against the appearance of the print result, the processing of resolving the cause of the complaint indicated by the word is performed. For example, when the user has uttered "It is light", adjustment of increasing the print density is performed and then the user is prompted to perform reprinting.

Specifically, through performance of simple action of uttering the word indicating the complaint by the user, the processing of resolving the cause indicated by the word is performed in the image forming apparatus 1. Therefore, only utterance of the word indicating the complaint against the appearance of the print result makes it possible to simply remove the cause of the complaint of the user against the appearance of the unsatisfactory print result without performing any operation.

When a print result obtained in an image forming apparatus such as a copier is not as the user desires, the user may utter a word indicating a complaint against the appearance of the print result. For example, it is assumed that the user utters a word "It is light" when the density of the print result is low and the user utters a word "It is shifted" when the print position is shifted. In this case, the image forming apparatus is desired to perform processing of resolving this complaint.

However, with the technology described in BACKGROUND, upon the utterance of the word indicating the complaint against the appearance of the print result by the user, processing that permits resolution of this complaint cannot be performed. That is, the aforementioned technology cannot resolve the cause of the complaint of the user against the appearance of the print result.

On the contrary, a voice recognition technique can be used in this embodiment to simply resolve the cause of the complaint of the user against the appearance of the print result.

The controller 100 performs control of executing the calibration processing as one of types of maintenance processing performed on the image forming apparatus 1 in normal occasion when a predefined execution condition has been met (for example, when a cumulative number of prints has reached a given number of prints defined as a threshold value or when cumulative print time has reached given time defined as a threshold value) separately from the calibration processing performed according to the first embodiment described above. That is, the calibration processing is regularly executed.

However, it is considered preferable that an interval in which the calibration processing is executed be shorter when the user frequently complains about the quality such as tone.

Thus, as another embodiment, after counting a number of print jobs and also counting a number of times of detection of the specific word (for example, blurred) included in the keywords stored in the keyword storage device 22 by the voice recognition device 103, upon judging that frequency in which the specific word is detected by the voice recognition device 103 is equal to or greater than a predefined threshold value, the controller 100 may shorten the interval in which the regularly executed calibration processing described above is performed. For example, the controller 100 shortens the execution interval by reducing the threshold value of the cumulative number of prints as a condition for executing the calibration processing.

FIG. 5 is a functional block diagram schematically illustrating main inner configuration of an image forming apparatus according to a second embodiment. The image forming apparatus according to the second embodiment differs from the image forming apparatus according to the first embodiment illustrated in FIG. 1 in that the image forming apparatus according to the second embodiment includes a voiceprint storage device 23 and a history storage device 24 and the control device 10 further includes a voiceprint recognition device 104. Same configuration and processing of the second embodiment as those of the first embodiment will be omitted from a description.

The voiceprint storage device 23 is formed of a storage device such as a flash memory. User voiceprint information is recorded on the voiceprint storage device 23.

The voiceprint recognition device 104 recognizes, through a known technique, a voiceprint based on the voice collected by the microphone 21 and compares the recognized voiceprint with a voiceprint indicated by the voiceprint information of each user stored in the voiceprint storage device 23 to thereby specify a user who has uttered a word indicating a complaint detected by the voice recognition device 103. Note that the voiceprint recognition device 104 is one example of a user specification device in the claims.

The history storage device 24 is formed of a storage device such as a flash memory and stores, in association with each user, history information of the uttered words indicating the complaints by the user.

Figure 6:
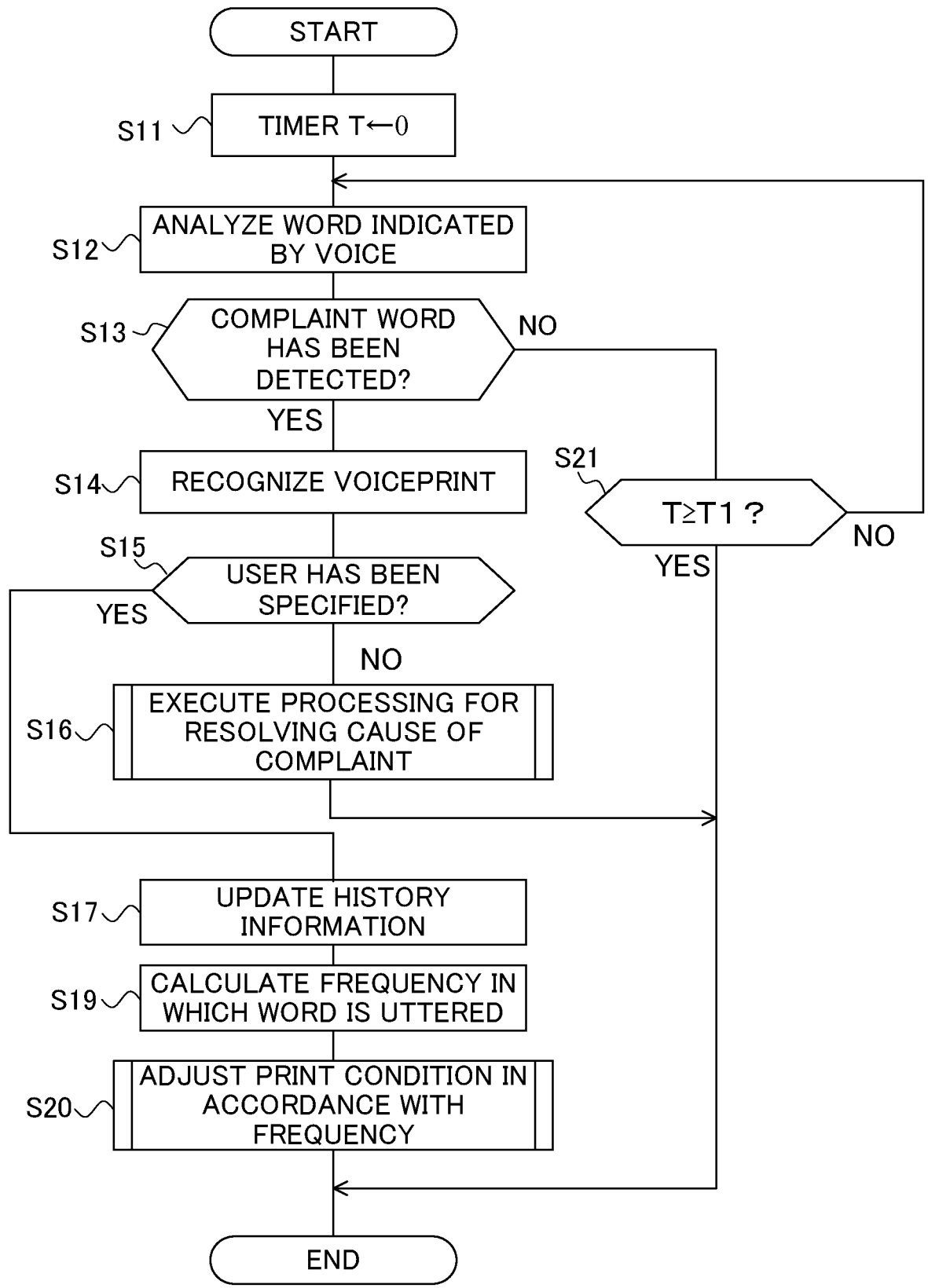
FIG. 6 is a flowchart illustrating one example of processing performed in a control device of the image forming apparatus according to the second embodiment.

One example of processing performed in the control device 10 of the image forming apparatus 1 according to the second embodiment will be described based on a flowchart illustrated in FIG. 6. Note that this processing is performed upon determining by the controller 100 that the recording paper P as a print result has been discharged onto the discharge tray 151.

First, the controller 100 is activated while resetting, at 0, the timer T for measuring time which has passed since the discharge of the recording paper P as the print result onto the discharge tray 151 (S11). The voice recognition device 103 analyzes a word indicated by voice collected by the microphone 21 (S12), and compares the analyzed word with the keyword stored in the keyword storage device 22 and detects, based on the word indicated by the recognized voice, the word (for example, light, dark, shifted, or blurred) indicating the predefined complaint against the appearance of the print result (S13).

Then upon judging by the controller 100 that the voice recognition device 103 has detected the word indicating the aforementioned complaint (YES in S13), the voiceprint recognition device 104 recognizes a voiceprint based on the voice collected by the microphone 21 and specifies, from the recognized voiceprint, the user who uttered the word indicating the complaint detected by the voice recognition device 103 (S14).

The controller 100 judges whether or not the voiceprint recognition device 104 could specify, based on the previously stored voiceprint of each user described above, the user who uttered the word indicating the aforementioned complaint (S15). Upon judging that the voiceprint recognition device 104 has not specified the user who uttered the word indicating the aforementioned complaint (NO in S15), as is the case with the first embodiment, the controller 100 executes the predefined processing for resolving the cause of the complaint indicated by the word (S16), and ends the processing. FIG. 7A is a diagram illustrating one example of processing performed by the controller 100 in S16.

On the other hand, upon judging that the voiceprint recognition device 104 has specified the user who uttered the word indicating the aforementioned complaint (YES in S15), the controller 100 updates (increments), based on the word indicating the complaint detected by the voice recognition device 103, the number of times of uttering the word indicating the aforementioned complaint by the user specified by the voiceprint recognition device 104 which number of times is stored as history information in the history storage device 24 (S17).

The controller 100 calculates, based on the history information stored in the history storage device 24, frequency in which the user specified by the voiceprint recognition device 104 utters the aforementioned word (S19) and adjusts the print condition in accordance with the aforementioned frequency (S20). Then the processing ends.

FIG. 7B is a diagram illustrating one example of processing performed by the controller 100 in S20. When the word uttered by the user is "It is light" and the word "light" has been detected by the voice recognition device 103, the controller 100 makes adjustment towards a side where the print density increases and then prompts the user to perform reprinting. At this point, for example, the controller 100 makes adjustment towards a side where the print density increases by one level when the frequency in which the word "light" is detected is lower than a predefined threshold value, and the controller 100 makes adjustment towards a side where the print density increases by two levels when the frequency is equal to or greater than the predefined threshold value.

Moreover, when the word uttered by the user is "It is dark" and the word "dark" has been detected by the voice recognition device 103, as described above, the controller 100 makes adjustment towards a side where the print density decreases and then prompts the user to perform reprinting. However, the controller 100 makes adjustment towards a side where the print density decreases by one level when the frequency in which the word "dark" is detected is lower than a predefined threshold value, and the controller 100 makes adjustment towards a side where the print density decreases by two levels when the frequency is equal to or greater than the predefined threshold value.

Moreover, upon judging in S13 that the voice recognition device 103 has not detected the word indicating the complaint (NO in S13), the controller 100 judges whether or not the timer T has reached the detection period T1 (S21).

Upon judging that the timer T has reached the detection period T1 (YES in S21), the controller 100 ends this processing. On the other hand, upon judging by the controller 100 that the timer T has not reached the detection period T1 (NO in S21), the processing returns to S12.

According to the second embodiment, the print condition adjustment processing performed upon the utterance of the word indicating the aforementioned complaint by the user is in accordance with each user, thus making it possible to provide the print condition adjustment processing which is highly satisfactory for each user.

In the second embodiment, the voiceprint recognition device 104 specifies the user based on the voiceprint recognized based on the voice collected by the microphone 21. Alternatively, the controller 100 may use login information (for example, user-specific ID information) inputted to the operation device 47 upon logging in the image forming apparatus 1 for each user to thereby specify the user. In this case, the controller 100 and the operation device 47 each serve as one example of a user specification device in the claims.

A large number of users have similar complaints against a print result, which is not attributable to user-side problems such as user's personal preference and print condition adjustment error but is attributable, with high possibility, to some problem occurring on a mechanism side of the image forming apparatus 1.

Thus, as still another embodiment, when the voice recognition device 103 has detected the word indicating the complaint, the controller 100 judges, based on the history information stored in the history storage device 24, whether or not a cumulative number N of people who uttered the aforementioned word has reached a predefined number N1 of people. Upon judging that the cumulative number N of people has not reached the number N1 of people as described above, the predefined processing for resolving the cause of the aforementioned complaint is performed. Upon judging that the cumulative number N of people has reached the number N1 of people (that is, when a large number of users have similar complaints against the print result), a message indicating predefined alert may be displayed at the display device 473 without performing the predefined processing described above. Note that examples of the message include a message "Please call a service person who has maintenance work capability.

Moreover, in still another embodiment, when the detection of the word indicating the predefined complaint described above by the voice recognition device 103 continues through a plurality of print jobs (that is, when the aforementioned complaint arises chronically), the controller 100 may perform the processing for resolving the cause of the complaint indicated by the word even for the print job in which the voice recognition device 103 has not detected the aforementioned word.

For example, when the user uttered "light" continuously through a plurality of print jobs, even for the print job in which the user did not utter "light", the controller 100 perform print density adjustment stored in association with the "light" or displays, at the display device 473, an operation screen for receiving user change of the set value of the print density and prompts the user to adjust the print density.

This disclosure is not limited to the configuration of the embodiments described above and various modifications thereto are permitted. Moreover, the embodiments have been described above, referring to a multifunction peripheral as one embodiment of the image forming apparatus according to this disclosure, but this is only one example and another image forming apparatus having a copy function and a printer may be used.

Moreover, the configuration and the processing indicated by the embodiments described above with reference to FIGS. 1 through 7B form just one embodiment of this disclosure, and it is not intended to limit this disclosure to the aforementioned configuration and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
    an image forming device forming an image on recording paper;
    a recording paper conveyance device conveying the recording paper to the image forming device and discharging, to an outside of the image forming apparatus, a print result obtained by the forming the image on the recording paper by the image forming device;
    a microphone; and
    a control device including a processor and, as a result of executing a control program by the processor, functioning as:
    a controller controlling the image forming device and the recording paper conveyance device in accordance with a print condition, and
    a voice recognition device recognizing voice collected by the microphone during a predefined detection period starting upon the discharge of the print result to the outside of the image forming apparatus and detecting, from the recognized voice, a word indicating a predefined complaint against appearance of the print result,
    wherein upon detecting the word indicating the predefined complaint by the voice recognition device, the controller performs predefined processing as processing of resolving a cause of the complaint indicated by the word,
    wherein after the predefined processing, the controller performs processing for prompting a user to perform reprinting,
    wherein as a result of executing the control program by the processor, the control device further functions as a user specification device specifying the user,
    further provided is a history storage device storing, in association with each user specified by the user specification device, history information for utterance of the word indicating the complaint, and
    based on the history information stored in the history storage device, the controller calculates frequency in which the user specified by the user specification device utters the word and adjusts the print condition in accordance with the frequency.

2. The image forming apparatus according to claim 1, wherein the user specification device is a voiceprint recognition device recognizing a voiceprint from the voice collected by the microphone and then specifying, from the recognized voiceprint, the user who uttered the word indicating the complaint detected by the voice recognition device.

3. The image forming apparatus according to claim 1, wherein
    the controller (i) upon detecting a word "light" as the word indicating the predefined complaint by the voice recognition device, performs print density adjustment of increasing print density, which is stored, in association with the word "light", as the predefined processing as the processing of resolving the cause of the complaint indicated by the word, (ii) upon detecting a word "dark" as the word indicating the predefined complaint by the voice recognition device, performs print density adjustment of decreasing the print density, which is stored, in association with the word "dark", as the predefined processing as the processing of resolving the cause of the complaint indicated by the word, (iii) upon detecting a word "shifted" as the word indicating the predefined complaint by the voice recognition device, performs print position adjustment of changing an image formation position with respect to the recording paper in a predefined direction by a predefined distance, which is stored, in association with the word "shifted", as the predefined processing as the processing of resolving the cause of the complaint indicated by the word, and (iv) upon detecting a word "blurred" as the word indicating the predefined complaint by the voice recognition device, performs calibration processing, which is stored, in association with the word "blurred", as the predefined processing as the processing of resolving the cause of the complaint indicated by the word.

4. The image forming apparatus according to claim 1, further comprising
    a display device,
    wherein as a result of executing the control program by the processor, the control device further functions as:
    an operation receiver receiving user operation on an operation screen displayed at the display device; and
    an adjuster changing the print condition based on the user operation received by the operation receiver,
    upon detecting the word indicating the predefined complaint by the voice recognition device, the controller causes the display device to display the operation screen for receiving print condition adjustment for the processing of resolving the cause of the complaint indicated by the word,
    the adjuster changes the print condition based on the user operation received by the operation receiver, and
    the controller performs the predefined processing under the changed print condition.

5. An image forming apparatus comprising:
    an image forming device forming an image on recording paper;
    a recording paper conveyance device conveying the recording paper to the image forming device and discharging, to an outside of the image forming apparatus, a print result obtained by the forming the image on the recording paper by the image forming device;
    a microphone; and
    a control device including a processor and, as a result of executing a control program by the processor, functioning as:
    a controller controlling the image forming device and the recording paper conveyance device in accordance with a print condition, and
    a voice recognition device recognizing voice collected by the microphone during a predefined detection period starting upon the discharge of the print result to the outside of the image forming apparatus and detecting, from the recognized voice, a word indicating a predefined complaint against appearance of the print result, wherein upon detecting the word indicating the predefined complaint by the voice recognition device, the controller performs predefined processing as processing of resolving a cause of the complaint indicated by the word, wherein when frequency in which the voice recognition device detects a specific word as the word indicating the predefined complaint is equal to or greater than a predefined threshold value, the controller executes, as the predefined processing, regularly executed predefined maintenance processing at a short interval at which the predefined maintenance processing is executed.

6. An image forming apparatus comprising:

an image forming device forming an image on recording paper;

a recording paper conveyance device conveying the recording paper to the image forming device and discharging; to an outside of the image forming apparatus, a print result obtained by the forming the image on the recording paper by the image forming device;

a microphone; and a control device including a processor and, as a result of executing a control program by the processor, functioning as:

a controller controlling the image forming device and the recording paper conveyance device in accordance with a print condition, and a voice recognition device recognizing voice collected by the microphone during a predefined detection period starting upon the discharge of the print result to the outside of the image forming apparatus and detecting, from the recognized voice, a word indicating a predefined complaint against appearance of the print result, wherein upon detecting the word indicating the predefined complaint by the voice recognition device, the controller performs predefined processing as processing of resolving a cause of the complaint indicated by the word, wherein when the detection of the word indicating the predefined complaint by the voice recognition device continues in a plurality of print jobs, the controller performs the predefined processing as the processing of resolving the cause of the complaint indicated by the word even for t a print job in which the voice recognition device has not detected the word.

* * * * *